United States Patent [19]

Bergner

[11] Patent Number: 5,200,446

[45] Date of Patent: Apr. 6, 1993

[54] PLASTIC MOLDING COMPOUND TREATED WITH AN ANTISTATIC AGENT

[75] Inventor: Klaus-Dieter Bergner, Biberbach, Fed. Rep. of Germany

[73] Assignee: Hoechst Aktiengesellschaft, Frankfurt am Main, Fed. Rep. of Germany

[21] Appl. No.: 697,766

[22] Filed: May 9, 1991

[30] Foreign Application Priority Data

May 11, 1990 [DE] Fed. Rep. of Germany ....... 4015184

[51] Int. Cl.$^5$ .................. C08K 5/42; C08L 27/00
[52] U.S. Cl. ................... 524/173; 524/567
[58] Field of Search ........................ 524/173

[56] References Cited

U.S. PATENT DOCUMENTS 4,113,679 9/1978 Andrascheck et al. ............. 524/567
4,298,710 11/1981 Ohya et al. ............... 525/5

FOREIGN PATENT DOCUMENTS 0114503 8/1984 European Pat. Off. .
1669709 8/1974 Fed. Rep. of Germany .
3310417 9/1984 Fed. Rep. of Germany .
51031-739 9/1974 Japan .
63-230764 9/1988 Japan .
1197552 8/1989 Japan .

Primary Examiner—Joseph L. Schofer
Assistant Examiner—Wu C. Cheng

[57] ABSTRACT

A plastic molding compound consisting of a thermoplastic or a thermosetting plastic and an antistatic agent, said antistatic agent being a mixture of a compound of formula I:

$$R^1 + (SO_3)_m M]_n \qquad (I)$$

and a compound of formula II:

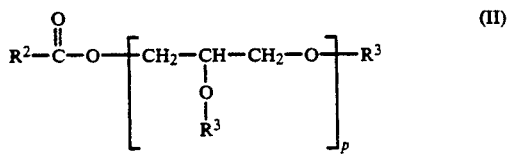

(II)

is distinguished by a good antistatic property, even when the amounts used are small, and by good physical and optical properties.

14 Claims, No Drawings

PLASTIC MOLDING COMPOUND TREATED WITH AN ANTISTATIC AGENT

DESCRIPTION

The present invention relates to a plastic molding compound treated with an antistatic agent, especially a molding compound based on polyvinyl chloride and polystyrene, which is characterized by a particular antistatic agent.

High volume resistance and surface resistivity have earned plastics an important position as insulating materials in the electrical and electronics sector. However, in all processes of separation from other media, these same structure-dependent properties result in a strong electrostatic charging of the surface. This is undesirable for a variety of reasons:

For the bulk of articles in daily use, the attraction of dust during storage and use should be avoided on the grounds of esthetics and hygiene.

In the processing of plastic parts of large surface area, e.g. sheets, fibers or powders, static charging produces forces which interfere appreciably with the process. They can prevent the proper winding of calendered sheets or of fibers. During processing or on dispensing units, film webs can adhere to one another to an undesirable degree. In the conveying of powders, lump formation or bridging can occur. Also, the printability of finished parts is impaired by static charging.

Discharging processes can result in damage to packed products.

Spark discharge can cause severe accidents, e.g. where there are dangers of fire and explosion when handling readily flammable gases, vapors and dusts, e.g. when using solvents or in mines.

Attempts are made in all these areas to reduce the chargeability of the plastic by means of suitable additives.

The conductivity of plastics can be increased in three ways in order to avoid charging:
  surface application of an "external" antistatic agent from a solution,
  incorporation of an "internal" (incorporable) antistatic agent into the plastic, or
  incorporation of electrically conductive additives (graphite, metals, organic semiconductors).

Electrically conductive additives are used if the surface resistance of the finished part is to be less than $10^8$ Ω. The mechanical properties are impaired because of the large amounts added: 2 to 20%.

External and internal antistatic agents are chemicals which form a conductive film on the surface of the plastic, usually in conjunction with the atmospheric moisture. This can happen due to the production of a pure film of moisture by means of water-attracting substances or by the deposition of an organic electrolyte.

Both groups have a similar build-up principle: A hydrophobic end ensures the anchoring of the additive to the polymer surface and a strongly polar end absorbs water molecules, which eliminate charges according to the principle of ion conductivity.

External antistatic agents are applied to the surface from aqueous or solvent-based preparations. More or less all surface-active compounds are effective, as are also numerous hygroscopic substances, such as glycerol, polyols or polyglycols, which do not possess the characteristic of surface activity.

In the case of internal antistatic agents, the hydrophobic end of the molecule is firmly anchored in the bulk of the polymer.

The majority of known antistatic agents can be subdivided into cationic, anionic and non-ionic compounds.

Cationic compounds usually consist of a bulky cation often containing a long alkyl radical (e.g. a quaternary ammonium, phosphonium or sulfonium salt), it also being possible for the quaternary group to occur in a ring system (e.g. imidazoline). In most cases, the anion is the chloride, methylsulfate or nitrate ion derived from the quaternization process. The quaternary ammonium salts, in particular, have gained acceptance as commercially available products. Cationic substances are most effective in polar polymers. However, their use is restricted by their adverse effect on the heat stability of certain polymers.

Anionic compounds have an anion (generally an alkylsulfonate, alkylsulfate, alkylphosphate, dithiocarbamate or carboxylate) as the active part of the molecule. The cations used are frequently alkali metals or, more rarely, alkaline earth metals. In practice, sodium alkylsulfonates, in particular, which develop a good antistatic action in polar polymers, have gained acceptance. The disadvantage is that their use is limited to muted colorations because of their tendency to produce haze. On account of their very high melting range, sodium alkylsulfonates are often very difficult to incorporate homogeneously into the plastic to be treated, and their hydrophilic character makes storage and proportioning more difficult.

Non-ionic compounds, for example polyethylene glycol esters or ethers, fatty acid esters or ethanolamides, mono- or di-glycerides or ethoxylated fatty amines, are uncharged surface-active molecules whose polarity is substantially lower than that of ionic compounds. Such products are generally liquids or waxy substances with a low softening range. Their low polarity and good compatibility makes representatives of these classes of compounds ideal internal antistatic agents for polyolefins. When used in large amounts, fatty acid esters of monohydric and polyhydric alcohols provide acceptable antistatic treatments, even in polar plastics, and make it possible to manufacture transparent moldings, in contrast to alkylsulfonates. Apart from the high use concentration required, which can lead to processing problems and affect mechanical and optical properties of the moldings, the sometimes pasty consistency of these products, with pour points above room temperature, has proved disadvantageous for the use of these products.

It is known to use a mixture of surface-active substances for the antistatic treatment of vinyl chloride resins (q.v. JP 51-031739). The mixture mentioned consists of a glycerol monofatty acid ester, a polyether, an alkyldiethanolamide and an alkylsulfonate. The mixture is said to be very effective, although the large number of constituents in the mixture makes it difficult to adapt it to different requirements.

It has now been found that excellent antistatic effects can be achieved with a mixture of only two surface-active compounds.

The invention thus relates to a plastic molding compound treated with an antistatic agent, which consists of 94 to 99.95% by weight, based on the molding compound, of a thermoplastic or a thermosetting plastic and 0.05 to 6% by weight, based on the molding compound, of an antistatic agent, said antistatic agent consisting of 5 to 40% by weight, based on the antistatic agent, of a compound of formula I:

$$R^1\text{\textdivideontimes}(SO_3)_mM]_n \quad (I)$$

wherein $R^1$ is a linear or branched aliphatic hydrocarbon radical having 4 to 30 carbon atoms or a cycloaliphatic hydrocarbon radical having 6 to 30 carbon atoms, it being possible for each sulfonate group to occupy a terminal or intermediate position, M is an alkali metal or alkaline earth metal atom, m is 1 or 2 and n is 1, 2, 3 or 4, and 60 to 95% by weight, based on the antistatic agent, of a compound of formula II:

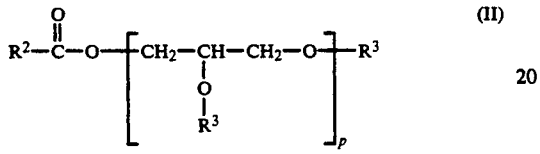

wherein $R^2$ is an aliphatic hydrocarbon radical having 3 to 23 carbon atoms, which can be substituted by one or two hydroxyl groups, or a cycloaliphatic or aromatic hydrocarbon radical having 6 to 22 carbon atoms, $R^3$ is a hydrogen atom or the radical

wherein $R^2$ is as defined above, and p is 1, 2, 3 or 4.

The plastic molding compound according to the invention contains a thermoplastic or thermosetting organic polymer, for example one of those listed below:
1. Polyvinyl chloride.
2. Vinyl chloride copolymers which can be prepared by the known processes (e.g. suspension, bulk, emulsion polymerization).
3. Copolymers of vinyl chloride with up to 30% by weight of comonomers such as e.g. vinyl acetate, vinylidene chloride, vinyl ether, acrylonitrile, acrylic acid esters, maleic acid monoesters or diesters or olefins, and vinyl chloride graft polymers.
4. Polystyrene and poly(p-methylstyrene).
5. Copolymers of styrene or α-methylstyrene with dienes or acrylic derivatives, such as e.g. styrene/butadiene, styrene/acrylonitrile, styrene/ ethyl methacrylate, styrene/butadiene/ethyl acrylate or styrene/acrylonitrile/methyl acrylate; high-impact mixtures of styrene copolymers and another polymer such as e.g. a polyacrylate, a diene polymer or an ethylene/propylene/diene terpolymer; and styrene block copolymers such as e.g. styrene/butadiene/styrene, styrene/isoprene/ styrene, styrene/ethylene-butylene/styrene or styrene/ethylene-propylene/styrene.
6. Styrene graft copolymers such as e.g. styrene on polybutadiene, styrene and acrylonitrile on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, or styrene and acrylonitrile on acrylate/butadiene copolymers, and mixtures thereof with the copolymers mentioned under 5), such as e.g. those known as so-called ABS, MBS, ASA or AES polymers.
7. Halogen-containing polymers such as e.g. polychloroprene, chlorinated rubber, chlorinated or chlorosulfonated polyethylene, or epichlorohydrin homopolymers and copolymers, especially polymers of halogen-containing vinyl compounds, such as e.g. polyvinylidene chloride, polyvinyl fluoride or polyvinylidene fluoride; and copolymers thereof, such as, for example, vinylidene chloride/vinyl acetate.
8. Polymers derived from α,β-unsaturated acids and derivatives thereof, such as polyacrylates and polymethacrylates, polyacrylamides and polyacrylonitriles.
9. Copolymers of the monomers mentioned under 8) with one another or with other unsaturated monomers, such as e.g. acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/ alkyl methacrylate/butadiene terpolymers.
10. Polymers derived from unsaturated alcohols and amines or acyl derivatives or acetals thereof, such as polyvinyl alcohol, polyvinyl acetate, stearate, benzoate or maleate, polyvinylbutyral, polyallyl phthalate or polyallylmelamine.
11. Homopolymers and copolymers of cyclic ethers, such as polyalkylene glycols, polyethylene oxide, polypropylene oxide, or copolymers thereof with bisglycidyl ethers.
12. Polyacetals such as polyoxymethylene, and polyoxymethylenes containing comonomers such as e.g. ethylene oxide.
13. Polyphenylene oxides and sulfides and mixtures thereof with styrene polymers.
14. Polyurethanes derived from polyethers, polyesters and polybutadienes with terminal hydroxyl groups on the one hand, and aliphatic or aromatic polyisocyanates on the other, and precursors thereof.
15. Polyamides and copolyamides derived from diamines and dicarboxylic acids and/or aminocarboxylic acids or the corresponding lactams, such as polyamide 4, polyamide 6, polyamide 6,6, polyamide 6,10, polyamide 11, polyamide 12, poly-2,4,4-trimethylhexamethylene terephthalamide or poly-m-phenylene isophthalamide, and block copolymers thereof with polyethers, e.g. with polyethylene glycol, polypropylene glycol or polytetramethylene glycol.
16. Polyureas, polyimides and polyamide-imides.
17. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, poly(2,2-bis-(4-hydroxyphenyl)propane) terephthalate or polyhydroxybenzoates, and block polyetheresters derived from polyethers with hydroxyl end groups.
18. Polycarbonates and polyester-carbonates.
19. Polysulfones, polyether-sulfones and polyetherketones.
20. Crosslinked polymers derived from aldehydes on the one hand and phenols, urea or melamine on the other, such as phenol/formaldehyde-, urea/formaldehyde and melamine/formaldehyde resins.

21. Drying and non-drying alkyd resins.
22. Unsaturated polyester resins derived from copolyesters of saturated and unsaturated dicarboxylic acids with polyhydric alcohols, and vinyl compounds as crosslinking agents, and also halogen-containing, poorly combustible modifications thereof.
23. Crosslinkable acrylic resins derived from substituted acrylic acid esters, e.g. from epoxyacrylates, urethane-acrylates or polyester-acrylates.
24. Alkyd resins, polyester resins and acrylate resins crosslinked with melamine resins, urea resins, polyisocyanates or epoxy resins.
25. Crosslinked epoxy resins derived from polyepoxides, e.g. from bisglycidyl ethers or from cycloaliphatic diepoxides.
26. Natural polymers such as cellulose, natural rubber or gelatin, and derivatives thereof which are chemically modified in a polymer-homologous manner, such as cellulose acetates, propionates and butyrates, or cellulose ethers such as methyl cellulose.
27. Mixtures (polyblends) of the aforesaid polymers, such as e.g. polyamide 6/EPDM or ABS, PVC/EVA, PVC/ABS, PVC/MBS, PC/ABS or PBTP/ABS.

The preferred polymers are those mentioned under 1) to 9), 11) to 19) and 27), especially those mentioned under 1) to 6), 8), 9), 11) to 15), 17), 18) and 27).

As antistatic agent, the plastic molding compound according to the invention contains a mixture of compounds of formulae I and II:

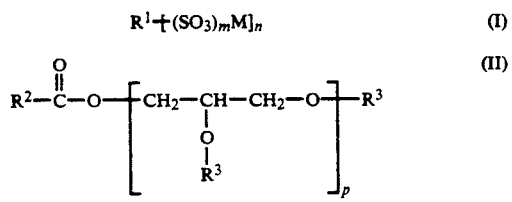

In these formulae, $R^1$ is a linear or branched aliphatic hydrocarbon radical having 4 to 30, preferably 4 to 20 and especially 10 to 20 carbon atoms, or a cycloaliphatic hydrocarbon radical having 6 to 30, preferably 6 to 20 carbon atoms, it being possible for each sulfonate group to occupy a terminal or intermediate position, $R^2$ is an aliphatic hydrocarbon radical having 3 to 23 carbon atoms, which can be substituted by one or two hydroxyl groups, or a cycloaliphatic or aromatic hydrocarbon radical having 6 to 22 carbon atoms, preferably an aliphatic hydrocarbon radical having 8 to 20 carbon atoms, which can be substituted by one or two hydroxyl groups, especially the alkyl radical of technical-grade coconut fatty acid, $R^3$ is a hydrogen atom or the radical

wherein $R^2$ is as defined above,

M is an alkali metal or alkaline earth metal atom, preferably a sodium atom, m is 1 or 2, preferably 1, n is 1, 2, 3 or 4, preferably 1 or 2, and is 1, 2, 3 or 4.

The antistatic agent consists of an alkylsulfonate of formula I and a full or partial ester, of formula II, of an aliphatic polyol having 3 to 7 hydroxyl groups with a carboxylic acid having the radical $R^2$ as defined above. Particular preference is afforded to a full or partial ester of mono-, di-, tri- or tetra-glycerol with technical-grade coconut fatty acid, which consists essentially of $C_{12}$–$C_{18}$ fatty acids but contains small amounts of $C_8$–$C_{10}$ fatty acids and oleic acid, mixed with an alkanesulfonate containing up to 40% by weight of polysulfonate, preferably disulfonate.

As a rule, the antistatic agent consists of one of each of the compounds of formulae I and II. In exceptional cases, however, several representatives of one and/or other group can be present. The antistatic agent consists of 5 to 40, preferably 10 to 40% by weight, of the compound or compounds of formula I and 60 to 95, preferably 60 to 90% by weight, of the compound or compounds of formula II.

The compounds of formulae I and II are known per se and are commercially available.

The antistatic agent to be used according to the invention can be incorporated in the form of its individual constituents into the materials to be treated, although it is preferable to prepare a mixture first.

All processes which make it possible to stir the compounds of formula I into the compounds of formula II at mixing temperatures of 20° to about 250° C., preferably 20° to about 150° C. and particularly preferably 20° to about 100° C. are suitable for preparing the antistatic agent to be used according to the invention, the mixing ratio of the individual components being chosen so that, utilizing the miscibility gaps of the individual components after cooling at room temperature, liquid antistatic mixtures are formed whose liquid state of aggregation at room temperature remains stable even on storage at temperatures in the range from −50° to +100° C. (i.e. behaves like a eutectic).

The novel antistatic agent is incorporated into the organic polymers by generally conventional methods. For example, it can be incorporated by mixing the compounds and other additives, if appropriate, into the melt before or during shaping. It can also be incorporated by direct application of the dissolved or dispersed compounds on to the polymer or mixing into a solution, suspension or emulsion of the polymer, the solvent subsequently being allowed to evaporate if appropriate. The amount to be added to the polymers is 0.05 to 6, preferably 0.1 to 4 and especially 0.1 to 2.5% by weight, based on the material to be treated.

The compounds can also be added to the polymers to be treated in the form of a masterbatch containing these compounds in a concentration of, for example, 1 to 50 and preferably 2.5 to 30% by weight.

Apart from the antistatic agent, the plastic molding compound can contain the conventional additives such as, for example, antioxidants, processing stabilizers, light stabilizers, lubricants, fillers, flame retardants, plasticizers, blowing agents, processing aids, impact strength modifiers, pigments, colorants or dyes.

The following Examples serve to illustrate the invention further.

EXAMPLES 1 TO 3

The antistatic mixtures 1 to 3 were prepared by placing the appropriate amount of a product of formula II (cf. Table 1) in a heatable mixer, heating it to about 80° C. and introducing the appropriate amount of the solid alkylsulfonate of formula I, with slow stirring. The stirring time depended on the rate of dissolution of the solid alkylsulfonate and was approx. 1.5 hours in the case of the antistatic mixture 2. Surprisingly, in Example 2, both the individual components went into a stable mixture and neither crystallization nor phase separation of the originally solid alkylsulfonate or the compound of formula II occurred, even after repeated cooling to −50° C. and heating to +80° C. The pour point of the antistatic mixture was markedly lowered—a eutectic had been formed.

EXAMPLES 4 AND 5

In one case an amount of isotridecyl stearate (Example 4) and in the other case an amount of glycerol monooleate (Example 5) were placed in a heatable mixer together with the appropriate amount of a product of formula II, the mixture was heated to approx. 80° C. and the alkylsulfonate was introduced, with slow stirring (cf. Table 1).

TABLE 2-continued

| Surface resistance R (DIN 53482) Ω | Half-life t (Honesto meter) (s) | Antistatic action |
|---|---|---|
| $10^{11}$ to $10^{12}$ | 10 to 60 | satisfactory moderate |
| $>10^{12}$ | >60 | unsatisfactory |

As the ambient atmospheric humidity and the storage time of the test pieces play a substantial role in the creation of the antistatic effect, the antistatic treatment of the test pieces was assessed in each case after storage for 2 days in a standard climate (23° C., 50% relative atmospheric humidity).

EXAMPLE 6

Antistatic treatment of Sn-stabilized rigid PVC
100 parts by weight of suspension polyvinyl chloride, K value 60,
b 1.5 parts by weight of octyltin thioglycolate,
1 part by weight of acrylate processing aid,
0.3 part by weight of glycerol dioleate,

TABLE 1

| | Example | | | | | Comparative Example | |
|---|---|---|---|---|---|---|---|
| | 1 | 2 | 3 | 4 | 5 | A | B |
| Technical-grade glycerol coconut fatty acid ester | 95 | 80 | 60 | 40 | 40 | 100 | — |
| Technical-grade alkanesulfonate (% by weight) (proportion of C12-20 polysulfonate < 40%) | 5 | 20 | 40 | 40 | 40 | — | 100 |
| Isotridecyl stearate, % by weight | — | — | — | 20 | — | — | — |
| Glycerol monooleate, % by weight | — | — | — | — | 20 | — | — |
| State of aggregation after preparation at room temperature | liquid | liquid | pasty | liquid | liquid | pasty | solid |
| State of aggregation at room temperature after repeated cooling to −20° C. and heating to +80° C. | solid (crystallizes out) | liquid | solid (crystallizes out) | liquid | solid | solid (crystallizes out) | solid |
| Pour point | 13° C. | 10° C. | 16° C. | 16° C. | 16° C. | 25° C. | — |
| Softening point | — | — | — | — | — | — | 200–220° C. |

The test of the surface resistance R, described in the following Examples, was performed in accordance with DIN 3482 with a feathertongue electrode. The half-life t of the test pieces treated with an antistatic agent, i.e. the time taken by a charge applied to the surface of the test piece to drop to half its initial value, was also measured. The antistatic treatment was assessed according to the scheme shown in Table 2:

TABLE 2

| Surface resistance R (DIN 53482) Ω | Half-life t (Honesto meter) (s) | Antistatic action |
|---|---|---|
| $<10^9$ | 0 (no charge) | excellent |
| $10^9$ to $10^{10}$ | 1 | very good |
| $10^{10}$ to $10^{11}$ | 2 to 10 | goot to |

0.3 part by weight of the montanic acid ester of ethanediol, and
x parts by weight of test product (cf. Table 3) were mixed in a heating/cooling mixer until the temperature reached 120° C. After cooling to room temperature, the compound was stored for 2 days (ageing).

The compound was then plasticized at 120° C. in a small kneader (Brabender) (kneading time = plasticizing time + 2 min) and the plastic compound was compressed to 60×60×1 mm sheets at 190° C. in a twin-platen press (compression time: 2 min at 0 bar + 4 min at 200 bar). The finished sheets were stored for 2 days at 23° C. and 50% relative atmospheric humidity. The antistatic properties of the sheets were then measured. The measurement results are collated in Table 3.

TABLE 3

| | Without antistatic agent | Product according to Example | | | | | |
|---|---|---|---|---|---|---|---|
| | | A | B | A | B | 2 | 4 |
| Amount used, x (parts by weight) | — | 1.2 | 0.3 | 1.5 | 1.5 | 1.5 | 1.5 |
| Assessment of the AST treatment | unsatisfactory | moderate | unsatisfactory | moderate | good | good | good |
| Transparency (%) of 2 mm pressed | 79 | 81 | 38 | 82 | 15 | 72 | 65 |

TABLE 3-continued

| | Without antistatic agent | Product according to Example | | | | |
|---|---|---|---|---|---|---|
| | | A | B | A | B | 2 | 4 |
| sheets | | | | | | | |

EXAMPLE 7

Antistatic treatment of Pb-stabilized rigid PVC
100 parts by weight of suspension polyvinyl chloride, K value 68,
0.6 part by weight of tribasic lead sulfate,
0.5 part by weight of dibasic lead stearate,
0.3 part by weight of calcium stearate,
0.3 part by weight of the montanic acid ester of ethanediol, and
x parts by weight of test product (cf. Table 4) were mixed in a heating/cooling mixer until the temperature reached 120° C. After cooling to room temperature, the compound was stored for 2 days (ageing). The compound was then plasticized at 120° C. in a small kneader (Brabender) (kneading time=plasticizing time+2 min) and the plastic compound was compressed to 60×60×1 mm sheets at 190° C. in a twin-platen press (compression time: 2 min at 0 bar +4 min at 200 bar). The finished sheets were stored for 2 days at 23° C. and 50% relative atmospheric humidity. The antistatic properties of the sheets were then measured. The measurement results are collated in Table 4.

TABLE 4

| | Without antistatic agent | Product according to Example | | | | | |
|---|---|---|---|---|---|---|---|
| | | A | B | A | B | 2 | 4 |
| Amount used, x (parts by weight) | — | 1.2 | 0.3 | 1.5 | 1.5 | 1.5 | 1.5 |
| Assessment of the AST treatment | unsatisfactory | unsatisfactory | unsatisfactory | unsatisfactory | moderate | good | moderate |

EXAMPLE 8

Antistatic treatment of Ca/Zn-stabilized rigid PVC
100 parts by weight of suspension polyvinyl chloride, K value 68,
0.3 part by weight of calcium stearate,
0.1 part by weight of zinc octoate,
0.2 part by weight of stearic acid,
0.2 part by weight of paraffin, m.p. 71° C.,
0.5 part by weight of the montanic acid ester of butanediol, partially saponified,
0.1 part by weight of polyethylene wax, m.p. 120° C., and
x parts by weight of test product (cf. Table 5) were mixed in a heating/cooling mixer until the temperature reached 120° C. After cooling to room temperature, the compound was stored for 2 days (ageing).

The compound was then plasticized at 120° C. in a small kneader (Brabender) (kneading time=plasticizing time+2 min) and the plastic compound was compressed to 60×60×1 mm sheets at 190° C. in a twin-platen press (compression time: 2 min at 0 bar +4 min at 200 bar). The finished sheets were stored for 2 days at 23° C at 50% relative atmospheric humidity. The antistatic properties of the sheets were then measured. The measurement results are collated in Table 5.

TABLE 5

| | Without antistatic agent | Product according to Example | | | | | |
|---|---|---|---|---|---|---|---|
| | | A | B | A | B | 2 | 4 |
| Amount used, x (parts by weight) | — | 1.2 | 0.3 | 1.5 | 1.5 | 1.5 | 1.5 |
| Assessment of the AST treatment | unsatisfactory | unsatisfactory | unsatisfactory | unsatisfactory | good | good | moderate |
| Transparency (%) of 2 mm pressed sheets | 77% | 70% | 60% | 65% | 15% | 60% | 50% |

EXAMPLE 9

Antistatic treatment of HIPS
100 parts by weight of high-impact polystyrene (MFI 200/5: 3 g/10 min), and
x parts by weight of test product were first mixed and then granulated on a twin-screw extruder (200/210/220/230° C.). Test boards of dimensions 60×60×4 mm were injection-molded from the granules on an injection molding machine (200/210/220/230° C., injection pressure 100 bar, dwell pressure 80 bar, injection time 10 sec). After storage for two days at 23° C. and 50% relative atmospheric humidity, the antistatic properties of the test boards were measured. Results in Table 6.

TABLE 6

| | Without antistatic agent | Product according to Example | | | | |
|---|---|---|---|---|---|---|
| | | A | B | A | B | 2 |
| Amount used, x (parts by weight) | — | 1.2 | 0.3 | 1.5 | 1.5 | 1.5 |
| Assessment of the AST treatment | unsatisfactory | unsatisfactory | unsatisfactory | good | | good |

What is claimed is:

1. A polyvinyl chloride composition containing an antistatic agent, which composition consists essentially of 94 to 99.95% by weight, based on the composition, of polyvinyl chloride and 0.05 to 6% by weight, based on the composition, of the antistatic agent, said antistatic agent consisting essentially of 5 to 40% by weight, based on the antistatic agent, of a compound of formula I:

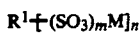  (I)

wherein $R^1$ is a linear or branched aliphatic hydrocarbon radical having 4 to 30 carbon atoms or a cycloaliphatic hydrocarbon radical having 6 to 30 carbon atoms, M is an alkali metal or alkaline earth metal atom, m is 1 or 2 and n is 1, 2, 3 or 4, each sulfonate group occupying a terminal or intermediate position, and 60 to 95% by weight, based on the antistatic agent, of a compound of formula II:

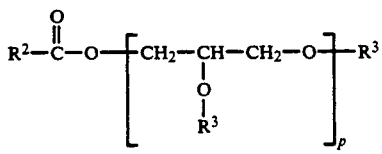  (II)

wherein $R^2$ is an aliphatic hydrocarbon radical having 3 to 23 carbon atoms, which is optionally substituted by one or two hydroxyl groups, or a cycloaliphatic or aromatic hydrocarbon radical having 6 to 22 carbon atoms, $R^3$ is a hydrogen atom or the radical

wherein $R^2$ is as defined above, and p is 1, 2, 3 or 4.

2. A plastic molding compound as claimed in claim 1, wherein the antistatic agent consists essentially of 5 to 40% by weight, based on the antistatic agent, of a compound of formula I:

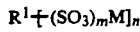  (I)

wherein $R^1$ is a linear or branched aliphatic hydrocarbon radical having 4 to 30 carbon atoms or a cycloaliphatic hydrocarbon radical having 6 to 30 carbon atoms, M is a sodium atom, m is 1 or 2 and n is 1, 2, 3 or 4, each sulfonate group occupying a terminal or intermediate position, and 60 to 95% by weight, based on the antistatic agent, of a compound of formula II:

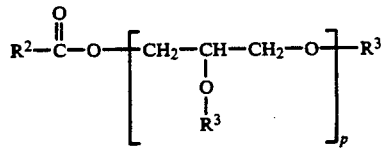  (II)

wherein $R^2$ is an aliphatic hydrocarbon radical having 3 to 23 carbon atoms, which is optionally substituted by one or two hydroxyl groups, $R^3$ is a hydrogen atom or the radical

wherein $R^2$ is as defined above, and p is 1, 2, 3 or 4.

3. A plastic molding compound as claimed in claim 1 which additionally contains antioxidants, processing stabilizers, light stabilizers, lubricants, fillers, flame retardants, plasticizers, blowing agents, processing aids, impact strength modifiers, pigments, colorants or dyes.

4. A plastic molding compound as claimed in claim 1, wherein, in said formulas I and II, said $R^1$ is a linear or branched aliphatic hydrocarbon radical having 10 to 20 carbon atoms or a cycloaliphatic hydrocarbon radical having 6 to 20 carbon atoms; and said $R^2$ in formulas I and II is an aliphatic hydrocarbon radical having 8 to 20 carbon atoms which is unsubstituted or substituted with one or two hydroxyl groups.

5. A plastic molding compound as claimed in claim 4, wherein said compound of formula I is an alkane sulfonate containing up to 40% by weight of polysulfonate, and said compound of formula II is a full or partial ester of mono-, di-, tri- or tetra-glycerol with a carboxylic acid of the formula $R^2COOH$, $R^2$ being as defined in claim 5.

6. A masterbatch for use in a plastic molding compound, said masterbatch comprising 1 to 50% by weight of the antistatic agent of claim 4.

7. A masterbatch for use in a plastic molding compound, said masterbatch comprising 2.5 to 30% by weight of the antistatic agent of claim 8.

8. A plastic molding compound as claimed in claim 1, wherein $R^1$ is a linear or branched aliphatic hydrocarbon radical having 4 to 20 carbon atoms, or a cycloaliphatic hydrocarbon radical having 6 to 20 carbon atoms.

9. A plastic molding compound as claimed in claim 1, wherein $R^1$ is a linear or branched aliphatic hydrocarbon radical having 10 to 20 carbon atoms.

10. A plastic molding compound as claimed in claim 1, wherein $R^2$ is an aliphatic hydrocarbon radical having 8 to 20 carbon atoms which can be substituted by one or two hydroxyl groups.

11. A plastic molding compound as claimed in claim 1, wherein $R^2$ is an alkyl radical of technical-grade coconut fatty acid.

12. A plastic molding compound as claimed in claim 1, wherein m is 1, and n is 1 or 2.

13. An antistatic agent, as claimed in claim 4, wherein said compound of formula II is a full or partial ester of mono-, di-, tri- or tetra-glycerol with technical-grade coconut fatty acid, which consists essentially of $C_{12}$–$C_{18}$ fatty acids but contains small amounts of $C_8$–$C_{10}$ fatty acids and oleic acid, mixed with an alkanesulfonate containing up to 40% by weight of polysulfonate.

14. A plastic molding compound as claimed in claim 1, wherein the amount of antistatic agent is 0.1 to 4% by weight based on the molding compound.

* * * * *